United States Patent [19]

Tomomatsu

[11] 3,879,529
[45] Apr. 22, 1975

[54] PROCESS FOR PREPARING PYROSULFURYL FLUORIDE

[75] Inventor: Hideo Tomomatsu, Crystal Lake, Ill.

[73] Assignee: The Quaker Oats Company, Chicago, Ill.

[22] Filed: Sept. 24, 1973

[21] Appl. No.: 400,008

[52] U.S. Cl. ............... 423/468; 423/512; 423/579
[51] Int. Cl. ............................................ C01b 17/45
[58] Field of Search ................... 423/468, 512, 579

[56] References Cited
UNITED STATES PATENTS
2,801,904   8/1957   Muetterties ........................ 423/468
2,879,138   3/1959   Muetterties ........................ 423/468

*Primary Examiner*—Edward Stern
*Attorney, Agent, or Firm*—Joseph P. O'Halloran

[57] ABSTRACT

This invention relates to a practical process for manufacturing pyrosulfuryl fluoride ($S_2O_5F_2$). The process comprises reacting fluosulfonic acid ($HSO_3F$) and phosphorus pentoxide ($P_2O_5$) and distilling pyrosulfuryl fluoride from the reaction mixture. Upon heating, the reaction mixture soon becomes a single phase liquid system, and the phosphoric acid produced as a by-product serves as a reaction solvent. Hence, additional reactants can be added to the reaction mixture or residue to provide continuous or continuing production of the product.

15 Claims, No Drawings

PROCESS FOR PREPARING PYROSULFURYL FLUORIDE

This invention relates to a process for preparing pyrosulfuryl fluoride.

Pyrosulfuryl fluoride is useful as an intermediate in the preparation of various derivatives containing fluorine and sulfur. For example, pyrosulfuryl fluoride is reported to have been used as an intermediate in the preparation of fluoro-sulfonates, fluosulfonic acid esters and sulfur oxyfluorides.

A variety of methods have been proposed for the preparation of pyrosulfuryl fluoride. Illustrative of such methods are the reaction of sulfur trioxide with fluoride salts, the reaction of pyrosulfuryl dichloride with benzoyl fluoride, the reaction of fluoro-sulfuric acid with arsenic pentoxide, and the reaction of sulfur dioxide with fluorine fluoro-sulfonate. These processes have not been regarded as satisfactory for practical manufacturing use, for example, because some of the chemicals involved in these methods are extremely expensive and are not commercially available. Other of the reactants are toxic or difficult to use, such as, for example, sulfur trioxide.

Pyrosulfuryl fluoride is also reported to have been prepared by the reaction of cyanogen chloride and fluosulfonic acid. However, cyanogen chloride is relatively unstable and is reported to be subject to explosive polymerizations. At room temperature it is a gas which is toxic and is a lachrymater and thus the latter process is accompanied with undesirable and even dangerous process conditions.

U.S. Pat. No. 3,275,413 discloses a process for preparing pyrosulfuryl fluoride which comprises reacting cyanuric chloride with at least a stoichiometric amount of fluosulfonic acid at a temperature in the range of about 120°C. to about 200°C. and distilling pyrosulfuryl fluoride from the reaction mixture at a head temperature of about 55°C. or less. The patented method also is regarded to be relatively undesirable inasmuch as the cyanuric chloride is toxic, is easily decomposed and presents handling problems.

Although pyrosulfuryl fluoride is known to be a highly reactive, toxic compound, it is highly desirable to provide a process for its manufacture which does not result in toxic residues, or residues which are difficult to dispose of without creating ecological problems. In addition some of the heretofore suggested processes inherently produce large quantities of undesirable gases which make the process, if not more dangerous, at least more cumbersome and expensive to operate.

It is an object of the present invention to provide a practical and economical direct process for the preparation of pyrosulfuryl fluoride.

Another object of this invention is to provide a process for the manufacture of pyrosulfuryl fluoride which utilizes reactants which are relatively safe, easily handled, and relatively available from commercial sources.

It is still another object of the present invention to provide a process for manufacture of pyrosulfuryl fluoride in extremely high yields and excellent purity using a single reactor, and which can employ ambient atmospheric pressure if desired conditions.

It is an additional object of the present invention to provide a process for the manufacture of pyrosulfuryl fluoride which does not inherently produce undesirable gases.

It is a further object of the present invention to provide a process for manufacturing pyrosulfuryl fluoride in which the by-product serves as an easily manageable, non-toxic reaction solvent.

It is a further object of the present invention to provide a process for the manufacture of pyrosulfuryl fluoride which does not result in toxic by-products, or by-products or reaction residues which are difficult to dispose of without creating ecological problems.

These and other objects which are all achieved in accordance with the present invention which is described hereinafter in general, and in particular with the aid of the numbered examples.

Generally speaking, the process of this invention comprises reacting fluosulfonic acid with phosphorous pentoxide and distilling pyrosulfuryl fluoride from the reaction mixture. In the preferred embodiments of this invention this reaction is carried at ambient atmospheric pressure conditions wherein the temperature of the reaction mixture is maintained at a level sufficient to continously distill the pyrosulfuryl fluoride product therefrom substantially as it is produced. Reaction mixture temperatures in the range 55° to 250°C. are useful in accordance with this invention although temperatures in the range from about 80°C. to about 180°C. are preferred. For illustrative purposes a typical preferred procedure for the manufacture of pyrosulfuryl fluoride in accordance with the present invention is described in Examples 1 and 2 and will be discussed in perspective thereafter. In the examples, and throughout the description and claims, unless other indicated, all parts are expressed in parts by weight, and all temperature are expressed in degree centigrade (°C.).

EXAMPLE 1

A glass-lined reactor vessel is fitted with heating means, pot temperature reading means, with a stirrer, with a reactant intake port, and with overhead conduit means for conducting overhead vapors to a condensor. The condensor is water cooled and a condensate receiver is fitted thereto and is vented through calcium sulfate and soda ash traps to the atmosphere. 100 parts (1 molecular weight unit) of fluosulfonic acid ($HSO_3F$) was placed in the reactor and, to this liquid, 100 parts (0.705 molecular weight units) of solid phosphorous pentoxide ($P_2O_5$) was added gradually. At this stage no heat was evolved. The resulting mixture was heated gradually to 8°C. with stirring, during which heating the reaction mixture became clear yellow liquid and pyrosulfuryl fluoride ($S_2O_5F_2$) started to distill off. A Therm-o-watch (TM.) was attached to a thermometer whose bulb resided in the overhead conduit connecting the reactor vessel and the condensor. The Therm-o-watch is a conventional electrical device by which a heater can be switched on and off automatically as a pre-set temperature sensing device senses the lower and upper temperatures in the pre set range of observed temperatures. In this example the Thermo-o-watch was set up to control the pot heater in response to the tower temperature. The Therm-o-watch was adjusted to keep the pot temperature sufficiently high to maintain the over-product vapor passing to the condensor at a temperature of about 56°C. During the reaction and distillation of this example the pot temperature was raised from about 80° to about 180°C. In this way pyrosulfuryl fluoride was continuously distilled from the reactor during the reaction. The heating was discontinued when the rate of distillation substantially discontinued. The recovered pyrosulfuryl fluoride product had a boiling point of about 50.8°C. at 760 mm Hg. The distillate product was pure and colorless pyrosulfuryl fluoride ($S_2O_5F_2$) in the amount of 86.9 parts by weight. This amounted to 95.4 percent of the theoretical yield based on the amount of fluosulfonic acid charged to the reactor.

Pyrosulfuryl fluoride is not only sensitive to moisture but is also extremely toxic and handling of the liquid product should be done with extreme care. Hence, the use of both a moisture trap and an alkaline trap is recommended in venting the product-receiving vessel to the atmosphere in the apparatus used in the exemplified method of the present invention.

EXAMPLE 2

The reaction residue remaining from Example 1 is cooled to about 80°C., and additional fluosulfonic acid is charged to the apparatus described in FIG. 1 and is admixed with the reaction residue remaining in the apparatus after the procedure of Example 1 was completed. The pot-temperature is gradually adjusted from about 80°C. to about 180°C., as in Example 1 during the course of additional distillation of pyrosulfuryl fluoride. The procedure of Example 1, from this point on, is repeated. Sufficient phosphorous pentoxide remains dissolved in the reaction mixture produced in Example 1 to react with the newly added fluosulfonic acid and to produce a pyrosulfuryl fluoride as in Example 1, in high yield, that is, at yields in the range 95–100 percent.

In a preferred embodiment as exemplified in the numbered examples, the product produced in accordance with the method of the present invention is distilled overhead during the course of the reaction while the reaction mixture temperature is maintained at a temperature above about 55°C., more preferably above about 75°C., and under atmospheric pressure conditions, e.g., starting at about 80°C. at 760 mm Hg. pressure and increasing during the course of product removal to temperatures up to about 250°C., e.g. to about 180°C. at 760 mm Hg. However, many mofifications and variations can be made without departing from the spirit and scope of the present invention. For example, although the preferred exemplified embodiment utilizes ambient atmospheric pressure conditions, pressures below atmospheric pressure and above atmospheric pressure can be employed. For example, the reactor system can be closed and subjected to below atmospheric pressure, during the reaction and distillation, if desired. However, it is regarded as more advantageous, generally speaking, to operate the reaction at temperatures in excess of 55°C., and preferably at temperatures above 75°C. in order to achieve a relatively fast rate of reaction. Consequently, when pressures below atmospheric pressure are utilized, it is still preferable to operate the reaction in accordance with the present invention by maintaining temperatures of the reaction mixture above about 75°C.

Also, superatmospheric pressures, particularly pressures up to about 5 atmospheres, can be utilized in accordance with the present invention. For example, the reaction apparatus substantially as described hereinbefore, except that it be equipped to accommodate the superatmospheric pressures encountered, can be closed, and appropriate quantities of fluosulfonic acid and phosphorous pentoxide can be admixed therein and maintained at a reaction temperature e.g. above 55°C., preferably above 75°C. In the latter embodiment the pressure of the reaction vessel is observed, and the reaction is discontinued when the pressure stabilizes indicating completion of the reaction, at which time overhead vapors are permitted to vent from the reactor and are collected through suitable condensing equipment. The pressure then typically drops to atmospheric pressure, assuming the sample receiving equipment is vented to the atmosphere as described in Example 1, and the reaction mixture is preferably heated to gradually raise the temperature of the reaction mixture up to about 180°C. during the course of the complete distillation of the product therefrom.

In another alternative embodiment, for example, the reaction vessel can be a closed vessel fitted for safely accommodating superatmospheric pressures, e.g. up to about 5 atmospheres, and the liquid contents of the reaction vessel can be maintained at reaction temperatures, e.g. above about 55°C. As pyrosulfuryl fluoride is formed the pressure gradually increases, and the reaction system can be fitted with means for continuously taking pyrosulfuryl fluoride from the overhead vapors either by continuous removal of liquid pyrosulfuryl fluoride being refluxed within the system, or by pressureregulator controlled take off of overhead gases for condensation and collection under ambient atmospheric pressure conditions, for example. However, it will be appreciated by those skilled in the art that although higher rate of reactions are achieved when superatmospheric pressures and relatively high temperatures are utilized. An important aspect of the present invention is the operation of the method of the present invention at ambient atmospheric pressure conditions.

Although in the exemplified embodiment the liquid reaction mixture was maintained at temperatures between about 80°C. and about 180°C., during removal of product, temperatures substantially above 180°C. e.g. up to about 250°C. can be utilized, if desired, although no upper limit to the pot temperature is contemplated. The heat-consumption as a consequence of the distillation of pyrosulfuryl fluoride product may impose some practical upper temperature limit as a consequence of the particular reactor system employed due to the heat-exchange and heat-input capabilities of the particular system utilized. In accordance with an embodiment of this invention the fluosulphonic acid and phosphorous pentoxide are reacted in a reaction solvent comprising anhydrous phosphoric acid.

Although the mechanism of the reaction is not completely understood it appears that the stoichiometric ratio of fluosulfonic acid to phosphorous pentoxide in accordance with the method of the present invention is about 6:1. Since the more expensive reactant, under present economic conditions, is the fluosulfonic acid, is presently preferred that more than the stoichiometric quantity of phosphorous pentoxide be used.

It will be apparent to those skilled in the art that the foregoing process is highly advantageous and presents considerable advantages with respect to the heretofore disclosed suggested processes. The distillate taken overhead in accordance with the present invention with a minimum of reflux is substantially pure pyrosulfuryl fluoride. In addition, no undesirable gaseous by-products are produced. Moreover, the liquid reaction residue is phosphoric acid, and is a material which is easily managed. The liquid reaction residue is of value as a chemical and as an agriculture fertilizer, and in agricultural fertilizer form presents substantially no disposal hazards, particularly after any excess phosphorous pentoxide remaining therein has been destroyed by the addition of water thereto.

Also, although the use of ambient atmospheric pressure conditions is preferred, and are eminently satisfactory in accordance with the present invention, the present invention can be carried out under superatomospheric pressure and under subatmospheric pressure conditions, as well. The process is relatively safe and is direct, and the reactants are relatively safely easily handled, and relatively available from commercial sources.

The process produces pyrosulfuryl fluoride in extremely high yields and excellent purity in a single reactor and the process produces no by-products which are difficult to manage or are toxic, or which are difficult to dispose of without creating ecological problems.

What is claimed is:

1. A process for preparing pyrosulfuryl fluoride comprising reacting fluosulfonic acid with phosphorous pentoxide to form pyrosulfuryl fluoride, and distilling pyrosulfuryl fluoride, and collecting the pryorsulfuryl fluoride by condensation.

2. The process of claim 1 wherein the phosphorous pentoxide is used in an amount in excess of one-sixth moles per mole of the fluosulfonic acid charged.

3. The process of claim 1 wherein fluosulfonic acid and phosphorous pentoxide are added to a reaction solvent comprising anhydrous phosphoric acid.

4. A process for preparing pyrosulfuryl fluoride comprising reacting fluosulfonic acid with phosphorous pentoxide and heating the reactants at atmospheric pressure at a temperature at which pyrosulfuryl fluoride is distilled overhead during the course of the reaction, and collecting the overhead distillate by condensation.

5. The process of claim 4 wherein the phosphorous pentoxide is used in an amount in excess of one-sixth moles per mole of fluosulfonic acid charged.

6. The process of claim 4 wherein fluosulfonic acid and phosphorous pentoxide are added to a reaction solvent comprising anhydrous phosphoric acid.

7. A process for preparing pyrosulfuryl fluoride which comprises reacting fluosulfonic acid and phosphorous pentoxide in a reaction solvent consisting essentially of anhydrous phosphoric acid, maintaining the resulting reaction mixture at a temperature at which pyrosulfuryl fluoride is distilled overhead therefrom, the distilling off and collecting the resulting pyrosulfuryl fluoride.

8. The process of claim 7 wherein the reaction mixture is heated at a temperature in the range 55°C. to 250°C. at ambient atmospheric pressure.

9. The process of claim 7 wherein the phosphorous pentoxide is used in an amount of about One-sixth mole per mole of fluosulfonic acid.

10. A process for preparing pyrosulfuryl fluoride comprising reacting fluosulfonic acid with phosphorous pentoxide in a closed system under superatmospheric pressure and maintaining the reaction mixture at an elevated temperature of above 55°C. until the pressure of the reaction vessel stabilizes, and distilling pyrosulfuryl fluoride from the resulting reaction misture.

11. The process of claim 10 wherein the phosphorous pentoxide is used in an amount in excess of One-sixth moles per mole of fluosulfonic acid charged.

12. The process of claim 10 wherein the fluosulfonic acid and phosphorous pentoxide is added to a reaction solvent comprising anhydrous phosphoric acid.

13. The process for preparing pyrosulfuryl fluoride comprising reacting fluosulfonic acid with phosphorous pentoxide in a closed reaction vessel and maintaining the temperature of the resulting reaction mixture at a temperature above 55°C., continuously withdrawing pyrosulfuryl fluoride from the head space of the closed reaction vessel while maintaining the elevated temperature and pressure.

14. The process of claim 13 wherein the phosphorous pentoxide is used in an amount in excess of one-sixth moles per mole of fluosulfonic acid charged.

15. The process of claim 13 wherein fluosulfonic acid and phosphorous pentoxide are added to a reaction solvent comprising anhydrous phosphoric acid.

* * * * *

UNITED STATES PATENT OFFICE
CERTIFICATE OF CORRECTION

PATENT NO. : 3,879,529
DATED : April 22, 1975
INVENTOR(S) : Hideo Tomomatsu

It is certified that error appears in the above—identified patent and that said Letters Patent are hereby corrected as shown below:

In column 2, line 48 delete "8°C.", and substitute therefor --80°C.--.

Signed and Sealed this twenty-fifth Day of May 1976

[SEAL]

Attest:

RUTH C. MASON
Attesting Officer

C. MARSHALL DANN
Commissioner of Patents and Trademarks